US012605868B2

(12) United States Patent
Yang

(10) Patent No.: US 12,605,868 B2
(45) Date of Patent: Apr. 21, 2026

(54) SEMICONDUCTOR PACKAGE INJECTION MOLDING MOLD, INJECTION MOLDING DEVICE AND SEMICONDUCTOR PACKAGE INJECTION MOLDING METHOD

(71) Applicant: JCET Management Co., Ltd., Shanghai City (CN)

(72) Inventor: Cheng Yang, Shanghai (CN)

(73) Assignee: JCET Management Co., Ltd., Shanghai City (CN)

( * ) Notice: Subject to any disclaimer, the term of this patent is extended or adjusted under 35 U.S.C. 154(b) by 135 days.

(21) Appl. No.: 18/497,977

(22) Filed: Oct. 30, 2023

(65) Prior Publication Data

US 2024/0140007 A1 May 2, 2024

(30) Foreign Application Priority Data

Oct. 31, 2022 (CN) .......................... 202211346176.3

(51) Int. Cl.
| | |
|---|---|
| *B29C 45/02* | (2006.01) |
| *B29C 45/14* | (2006.01) |
| *B29C 45/26* | (2006.01) |
| *B29L 31/34* | (2006.01) |

(52) U.S. Cl.
CPC ........ B29C 45/14655 (2013.01); B29C 45/02 (2013.01); B29C 45/26 (2013.01); *B29L 2031/3406* (2013.01)

(58) Field of Classification Search
CPC ... B29C 45/02; B29C 45/34; B29C 45/14065; B29C 45/14336; B29C 45/76; B29C 45/77; B29C 45/78; B29C 45/80
See application file for complete search history.

(56) References Cited

U.S. PATENT DOCUMENTS

| | | | | | |
|---|---|---|---|---|---|
| 5,846,477 | A | * | 12/1998 | Hotta ................ | B29C 45/14655 264/272.17 |
| 6,652,799 | B2 | * | 11/2003 | Seng ........................ | B29C 45/02 264/272.17 |
| 2002/0020940 | A1 | * | 2/2002 | Kiritani ................... | B29C 33/18 264/272.17 |
| 2017/0028598 | A1 | * | 2/2017 | Choi ...................... | B29C 43/021 |
| 2017/0271186 | A1 | * | 9/2017 | Maeda .............. | B29C 45/14336 |

\* cited by examiner

*Primary Examiner* — Thu Khanh T. Nguyen
(74) *Attorney, Agent, or Firm* — JCIPRNET

(57) ABSTRACT

The present invention relates to the technical field of chip package, in particular to a semiconductor package injection molding mold, a semiconductor package injection molding device and a semiconductor package injection molding method. The semiconductor package injection molding mold includes a bottom mold and a top mold. The upper surface of the bottom mold is fitted with the lower surface of a substrate to form a semiconductor package structure; the top mold is matched with the bottom mold; the top mold has a cavity; the cavity is oriented toward the upper surface of the substrate and is used to accommodate a plastic package layer formed on the upper surface of the substrate; through holes that penetrate through the bottom mold are formed at positions corresponding to the substrate in the bottom mold; and the through holes are connected with an external pressure source.

11 Claims, 2 Drawing Sheets

SEMICONDUCTOR PACKAGE INJECTION MOLDING MOLD, INJECTION MOLDING DEVICE AND SEMICONDUCTOR PACKAGE INJECTION MOLDING METHOD

CROSS-REFERENCE TO RELATED APPLICATION

This application claims the priority benefit of China application serial no. 202211346176.3, filed on Oct. 31, 2022. The entirety of the above-mentioned patent application is hereby incorporated by reference herein and made a part of this specification.

TECHNICAL FIELD

The present invention relates to the technical field of chip package, in particular to a semiconductor package injection molding mold, a semiconductor package injection molding device and a semiconductor package injection molding method.

BACKGROUND

Semiconductor package attaches a microelectronic chip to a plastic package substrate and packages the chip with plastic package material, wherein a molded matrix array package (MMAP) method can be used to fixedly package the chip on the plastic package substrate.

Two surfaces of the plastic package substrate to be molded and packaged are not flat. The upper surface of the plastic package substrate is packaged with a microelectronic chip or some other electrical devices, and the lower surface of the plastic package substrate near a bottom mold is provided with solder joints or some patch devices. Thus, a groove or cavity is formed on the lower surface of the plastic package substrate. However, when the MMAP method is used for package, due to high pressure generated on the upper surface of the plastic package substrate during the injection transfer molding of the upper surface of the plastic package substrate, the pressure in the final transfer molding holding stage will even be greater than 6 MPa.

When the upper surface of the plastic package substrate is subjected to downward high pressure, and the lower surface of the plastic package substrate has the groove or cavity, the plastic package substrate will warp, which is easy to cause damage and falling of the microelectronic chip or some other electrical devices in electrical contact, and even cause the fracture of the plastic package substrate or the breakage of the microelectronic chip seriously.

In order to solve the above problems, different package bottom molds are designed for different plastic package substrates in the prior art. The bottom mold is provided with a convex structure at the corresponding position of the groove or cavity on the lower surface of the plastic package substrate, so that there is no cavity between the bottom mold and the plastic package substrate during transfer molding, thereby avoiding the buckling of the plastic package substrate under stress. However, the design of a special bottom mold for each plastic package substrate forms some convex structures in specific locations, which has too high cost and prolongs the delivery time. At the same time, under the pressure of the cost, the production accuracy of the bottom mold formed by the current bottom mold processing technology is limited, and the bottom mold cannot be fully fitted with the plastic package substrate, so there are still some cavities. The bottom mold cannot provide perfect support, and the plastic package substrate will still be affected by stress during injection molding.

SUMMARY

In order to overcome the shortcomings of the prior art, the present invention provides a semiconductor package injection molding mold, a semiconductor package injection molding device and a semiconductor package injection molding method.

To achieve the above purpose, an embodiment of the present invention further provides a semiconductor package injection molding mold, including:

a bottom mold and a top mold, wherein the upper surface of the bottom mold is fitted with the lower surface of a substrate to be packaged; the top mold is matched with the bottom mold; the top mold has a cavity; the cavity is oriented toward the upper surface of the substrate and is used to accommodate a plastic package layer formed on the upper surface of the substrate; through holes that penetrate through the bottom mold are formed at positions corresponding to the substrate in the bottom mold; and the through holes are connected with an external pressure source.

Optionally, the lower surface of the substrate has a groove or a bulge, and the through holes are arranged at positions corresponding to the groove or bulge.

Optionally, when the lower surface of the substrate has the bulge, the size of the through hole is greater than the size of the bulge.

Optionally, the number of the through holes is multiple and the through holes are evenly distributed directly below the corresponding substrate.

Optionally, the upper surface of the bottom mold is a flat surface.

The embodiment of the present invention further provides a semiconductor package injection molding device, which includes: a bottom mold, a top mold, a pressure source and a substrate; the upper surface of the bottom mold is fitted with the lower surface of the substrate; the top mold is matched with the bottom mold; the top mold is provided with a cavity; the cavity is oriented towards the upper surface of the substrate and is used to accommodate a plastic package layer formed on the upper surface of the substrate; through holes that penetrate through the bottom mold are formed at positions corresponding to the substrate in the bottom mold; the through holes are connected with the pressure source; and the pressure on the lower surface of the substrate generated by the pressure source is used to balance the pressure on the upper surface of the substrate during injection molding.

Optionally, the lower surface of the substrate has grooves and/or bulges, and the through holes are arranged at least in the positions corresponding to the grooves and/or bulges.

Optionally, each groove corresponds to at least one through hole.

Optionally, when the lower surface of the substrate has the bulge, the size of the corresponding through hole is greater than the size of the bulge.

Optionally, a pressure sensor is arranged in the through hole of the corresponding groove or bulge or on the lower surface of the substrate.

Optionally, the pressures corresponding to different through holes in the bottom mold are different, thereby forming different pressure distributions.

Optionally, the pressure corresponding to the same hole at different times can be adjusted.

Optionally, the pressure source is a pneumatic or hydraulic source.

Optionally, the injection molding technology is a transfer molding injection-molding technology.

The embodiment of the present invention further provides a semiconductor package injection molding method for the semiconductor package injection molding device, including:

superimposing, clamping and fixing the bottom mold, the substrate and the top mold, fitting the upper surface of the bottom mold with the lower surface of the substrate, orienting the cavity of the top mold towards the upper surface of the substrate and fitting the top mold with the upper surface of the substrate;

when the upper surface of the substrate forms the plastic package layer by the transfer molding technology, applying pressure to the lower surface of the substrate by the pressure source through the through holes of the bottom mold, and balancing the pressure on the upper surface of the substrate during injection molding by the pressure generated by the pressure source on the lower surface of the substrate.

Optionally, when the pressure on the upper surface of the substrate exceeds a preset value during transfer molding, the pressure source is opened and the pressure source is used to apply pressure to the lower surface of the substrate through the through holes of the bottom mold.

Optionally, during the transfer molding, the corresponding pressure to be applied to the lower surface of the substrate is calculated in real time by detecting the pressure generated on the upper surface of the substrate, and the pressure source is used to apply the corresponding pressure to the lower surface of the substrate through the through holes of the bottom mold.

Optionally, according to different substrates, the pressures corresponding to different through holes in the bottom mold are different, thereby forming different pressure distributions.

Optionally, the injection molding technology is a transfer molding injection-molding technology.

In conclusion, the beneficial effects of the present invention are as follows:

The bottom mold of the present invention has the through holes at the corresponding positions of the substrate, and the through holes are connected with the external pressure source. When injection-molding transfer molding is carried out, the pressure on the lower surface of the substrate generated by the pressure source is used to balance the pressure on the upper surface of the substrate during injection molding, so that the stress on the substrate is reduced, the substrate will not warp, and the electrical performance of the microelectronic chip thereon and the substrate is not damaged.

Further, when the air pressure of the external pressure source corresponding to different through holes is adjustable, the pressure balance between the upper surface and the lower surface of the substrate can be achieved by adjusting the air pressure corresponding to different through holes for different substrates, without customizing specific bottom molds for different substrates, thereby greatly reducing the cost and production time.

To make the above and other purposes, features and advantages of the present invention more clear and understandable, the present invention is described in detail below through preferred embodiments and in combination with the drawings.

DETAILED DESCRIPTION OF THE EMBODIMENTS

In order to facilitate the understanding of those skilled in the art, the present invention is further described in detail below in combination with specific embodiments. In the following description, numerous specific details (e.g., specific materials, dimensions, operating parameters, etc.) are described to provide a complete understanding of the present invention, and the well-known microelectronics design and package techniques are not described in the specific details to avoid unnecessarily making the present invention unclear. "Implementation modes or embodiments" mentioned throughout this description mean that specific features, structures, materials, or properties described together with the implementation modes are contained in at least one implementation mode of the present invention. Therefore, the phrase "in an embodiment" appearing at various locations throughout this description does not necessarily refer to the same embodiment of the present invention. In addition, the specific features, structures, materials or properties may be combined in one or more implementation mode in any suitable manner.

Terms "above", "below", "between" and "on" refer to the relative position of one structure or layer with respect to other structures or layers. Similarly, for example, a layer deposited or arranged above or below another layer may be in direct contact with another layer or may have one or more intermediate layers. In addition, a layer deposited or arranged between the layers may be in direct contact with the layers or may have one or more intermediate layers. Furthermore, a layer deposited or arranged between layers may be in direct contact with the layer or may have one or more intermediate layers. Contrarily, the first layer or first structure located "above" the second layer or second structure is in contact with the second layer or second structure. In addition, when deposition, modification and film removal are operated with respect to the initial substrate, the relative position of one structure with respect to another structure is provided without regard to the absolute orientation of the substrate.

Figure 2:
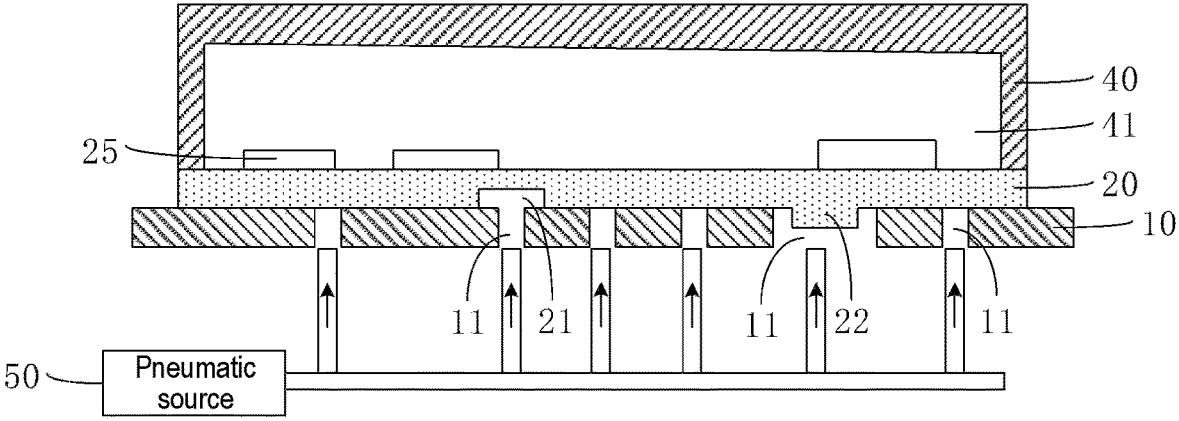
FIG. 2 is a structural schematic diagram of a semiconductor package injection molding device in a second embodiment of the present invention.
Figure 3:
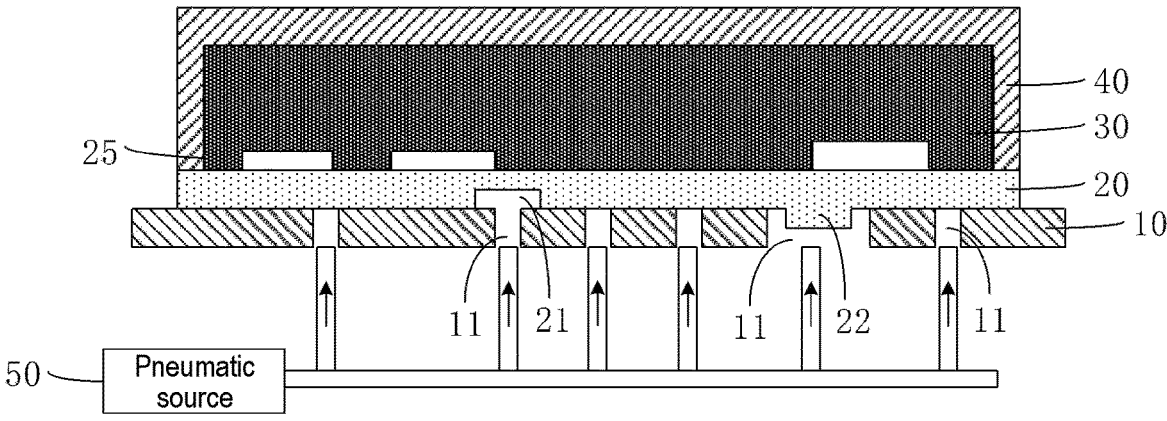
FIG. 3 is a structural schematic diagram of an injection molding plastic package layer of a semiconductor package injection molding device in the second embodiment of the present invention.
Figure 4:
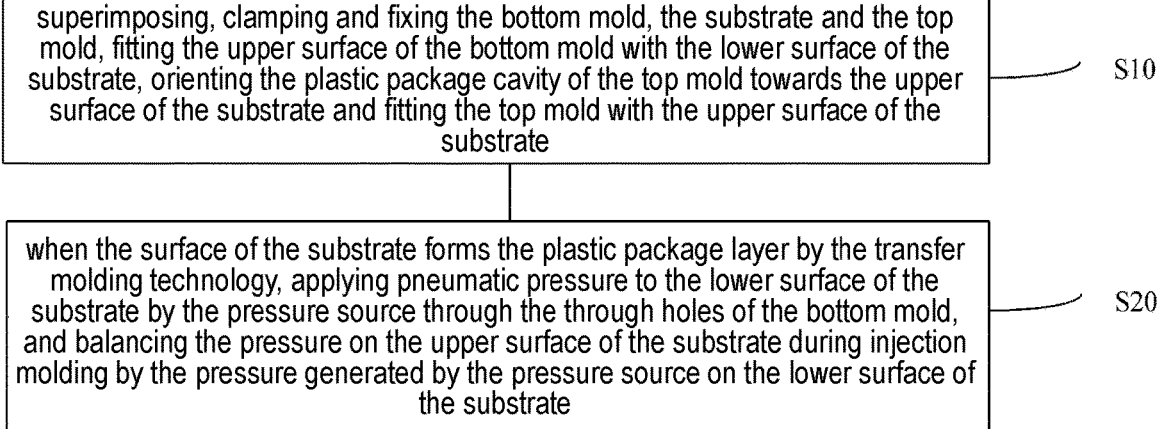
FIG. 4 is a flow chart of a semiconductor package injection molding method in the embodiment of the present invention.

By referring to FIG. 2 and FIG. 3, the embodiment of the present invention firstly provides a semiconductor package injection molding device, which includes:

a bottom mold 10, a top mold 40, a pressure source 50 and a substrate 20; the top mold is matched with the bottom mold so that the bottom mold 10, the substrate 20 and the top mold 40 are superposed, clamped and fixed; the upper surface of the bottom mold 10 is fitted with the lower surface of the substrate 20; the top mold 40 is provided with a cavity 41; the cavity 41 is used to accommodate a plastic package layer 30 formed on the upper surface of the substrate 20; the cavity 41 of the top mold 40 is oriented towards the upper surface of the substrate 20 and the top mold 40 is fitted with the upper surface of the substrate 20; through holes 11 that penetrate through the bottom mold are formed at positions corresponding to the substrate 20 in the bottom mold 10; the through holes 11 are connected with the pressure source 50; and the pressure on the lower surface of the substrate 20 generated by the pressure source 50 is used to balance the pressure on the upper surface of the substrate 20 during injection molding.

In the present embodiment, the upper surface of the substrate 20 to form a semiconductor package structure has a microelectronic chip 25; the microelectronic chip 25 is fitted to the upper surface of the substrate 20 through a technology such as lead bonding or flip chip package technology, so as to realize electrical interconnection between the microelectronic chip and the substrate; and the microelectronic chip is isolated from the external moisture and air by using the plastic package layer 30.

The microelectronic chip 25 may be a memory chip, a special-purpose IC (ASIC) chip, a sensor chip, a microprocessor chip, a microelectromechanical system (MEMS) chip, etc., or another semiconductor package structure packaged with a chip, which will not be specially limited here.

In other embodiments, the upper surface of the substrate is packaged with one or more microelectronic chips, and may also be mounted with discrete devices or other structures, such as chip resistors or chip capacitors, etc. The plastic package layer packages the microelectronic chips and the discrete devices in the same plastic package layer.

Figure 1:
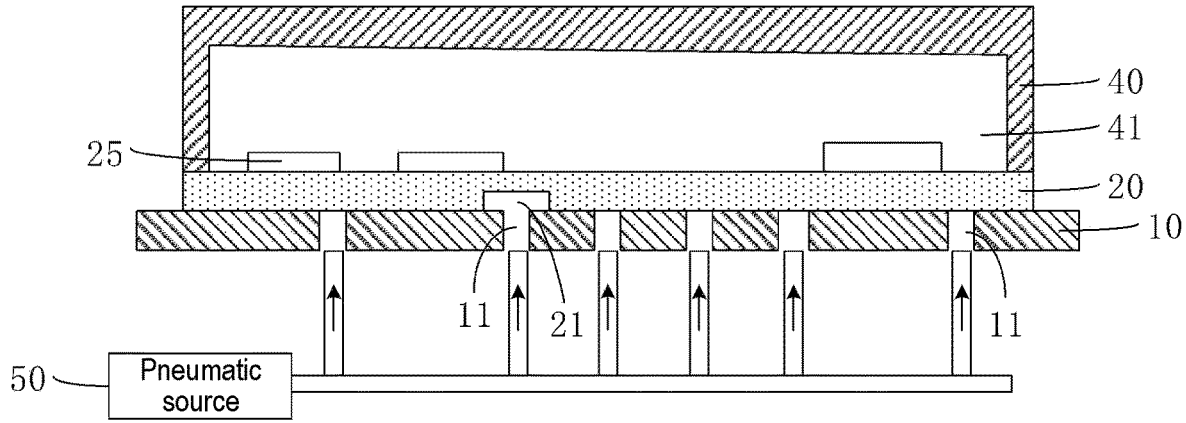
FIG. 1 is a structural schematic diagram of a semiconductor package injection molding device in a first embodiment of the present invention.

In one embodiment, by referring to FIG. 1, the lower surface of the substrate 20 has a groove 21 and the lower surface of the substrate 20 is uneven because solder joints or certain patch devices are located near the lower surface of the package bottom mold.

In another embodiment, by referring to FIG. 2, the lower surface of the substrate 20 is uneven and has a bulge 22 in addition to a groove 21 because solder joints or certain patch devices are located near the lower surface of the package bottom mold.

In another embodiment, the lower surface of the substrate may also have only the bulge.

In the present embodiment, the upper surface of the bottom mold 10 is fitted with the lower surface of the substrate 20, the upper surface of the bottom mold 10 is a flat surface, and the lower surface of the substrate 20 is an uneven surface and has bulges or recesses. In order to avoid buckling of the substrate under stress in the prior art, different bottom molds need to be designed for different substrates, and the bottom molds are provided with bulges or recess structures at the corresponding positions of the groove or cavity on the lower surface of the substrate. The production cost of the bottom molds is high, the delivery time of the package is extended, and it is difficult to achieve high-precision fitting. However, in the embodiment of the present invention, because the pressure is generated on the lower surface of the substrate by using the through holes and the pressure source, and the pressure is used to balance the pressure of the injection molding materials on the upper surface of the substrate during injection-molding transfer molding, the perfect support of the substrate is achieved without using the bottom molds. The bottom mold does not need to customize the corresponding convex structure or concave structure for the groove or bulge on the lower surface of the substrate, and one bottom mold can be applied to a plurality of different substrates, which reduces the cost of plastic package and shortens the delivery time of the package.

In other embodiments, the upper surface of the bottom mold 10 may also be a surface with a certain concave-convex structure, but because the concave-convex structure does not need to design different bottom molds completely according to different substrates, the machining accuracy corresponding to the concave-convex position and height of the bottom mold needs not be very limited to the position and height of the bulge or recess corresponding to the substrate. Therefore, the manufacturing cost of the bottom mold is reduced, and the delivery time of the package is shortened.

The semiconductor package injection molding device of the embodiment of the present invention is used for semiconductor package. The substrate of the embodiment of the present invention can be arbitrarily arranged and designed according to the types of the packaged microelectronic chip and substrate. According to the needs, grooves or bulges are formed on the lower surface of the substrate, without considering the impact on the bottom mold, and without worrying about the buckling of the substrate under stress due to the grooves or bulges on the lower surface of the substrate, thereby greatly reducing the design difficulty of the substrate.

The positions corresponding to the substrate 20 in the bottom mold 10 have through holes 11. The positions of the through holes can be customized according to the groove or bulge on the lower surface of the substrate. The through holes are located in the position corresponding to the groove or bulge.

By referring to FIG. 1, the through holes 11 are arranged at the position corresponding to the groove 21 and the positions of other regions. By referring to FIG. 2, the through holes 11 are arranged at the position corresponding to the groove 21, the position corresponding to the bulge 22, and the positions of other regions.

In other embodiments, the through holes can also be arranged in a position without the groove or the bulge, and the pressure source connected with the through holes can be used to regulate the air pressure of the through holes at different positions.

In the present embodiment, even if the positions of the through holes of the bottom mold 10 are customized according to the groove and bulge positions of different substrates, the customizing cost of the bottom mold is low because the upper surface of the bottom mold is a flat surface without the need of considering the problem of production accuracy of the convex structure or concave structure on the upper surface of the bottom mold.

When the lower surface of the substrate has a bulge 22, the size of the through hole 11 at the position corresponding to the bulge 22 is greater than the size of the bulge 22, so that the through hole 11 fully accommodates the bulge 22 and the substrate and the bottom mold are fully fitted during injection molding. Because the size of the through hole 11 at the position corresponding to the bulge 22 is greater than the size of other through holes, the substrate corresponding to the position of the bulge 22 is more susceptible to the stress of warping. Therefore, by adjusting the air pressure of the through hole 11 at the position corresponding to the bulge 22, the air pressure of the through hole 11 at the position corresponding to the bulge 22 is greater than the air pressure of the through hole 11 at other positions.

In the present embodiment, the number of the through holes is multiple, and the through holes are all distributed directly below the corresponding substrate.

In the present embodiment, the bottom mold determines the positions of the through holes 11 according to the specific design of the substrate. The through holes 11 are not only arranged in the position corresponding to groove 21 and the position corresponding to the bulge 22, but also uniformly arranged in other regions or arranged in accordance with the layout of internal density and external thinness.

In other embodiments, the through holes may also be uniformly arranged in the region directly below the substrate, and the air pressure corresponding to each through hole is adjusted by the external pressure source 50 corresponding to the through holes.

In the present embodiment, the external pressure source 50 is connected with the through holes 11 of the bottom mold 10, and the air pressure generated by the pressure source 50 is applied to the lower surface of the substrate 20 to balance the pressure on the upper surface of the substrate during transfer molding.

In the present embodiment, the pressure source may be a pneumatic source, such as a pneumatic pump. In other embodiments, the pressure source may also be a hydraulic source which uses liquid to apply pressure to the through holes.

In one embodiment, each through hole of the bottom mold is correspondingly connected with one pneumatic electric control valve and connected to the pressure source. The air pressure of each through hole is respectively controlled by the pneumatic electric control valve, so that the air pressures corresponding to the through holes at different positions of the bottom mold are different. The air pressures corresponding to the through holes at different times can also be different, to flexibly adjust the pressure applied to the lower surface of the substrate, so that one bottom mold can be applied to different substrates.

In the present embodiment, because the positions and the sizes of different through holes in the bottom mold are different according to different substrates, the air pressures corresponding to the through holes at different positions are different to form different pressure distributions, to more accurately balance the pressures on the upper and lower surfaces of the substrate. Because the sizes of the through holes 11 at the positions corresponding to the bulge 22 are greater than the sizes of other through holes, the through holes 11 at the positions corresponding to the bulge 22 will form a cavity and make the substrate 20 at the corresponding position susceptible to greater stress. Therefore, the air pressures of the through holes 11 at the positions corresponding to the bulge 22 are greater than the air pressures of the through holes 11 at other positions.

In other embodiments, a plurality of through holes of the bottom mold may also be connected with a pneumatic electric valve and connected to the pressure source, and the pneumatic electric valve is used to control the air pressures of the plurality of through holes to control the pressure applied to the lower surface of the substrate in a large area.

In other embodiments, all the through holes of the bottom mold can also be directly connected with the same pressure source, so that all the through holes correspond to the same pressure change. The pressure on the lower surface of the substrate generated by the pressure source as a whole can be used to balance the pressure on the upper surface of the substrate during injection-molding transfer molding, which can also effectively reduce the adverse effects caused by the recess or the bulge on the lower surface of the substrate during injection-molding transfer molding.

In other embodiments, a pressure sensor may also be arranged in the through holes corresponding to the groove or bulge or on the lower surface of the substrate. Due to the large size of the through holes corresponding to the groove or the bulge, it is convenient to accommodate the pressure sensor. The position corresponding to the groove or the bulge is more prone to warping, which needs more accurate pressure detection, to drive the pressure source to apply more precise pressure to the corresponding through holes. The pressure sensor is arranged at the position of the through hole corresponding to the groove or the bulge, or the pressure sensor is arranged on the lower surface of the substrate corresponding to the groove or the bulge.

In the present embodiment, a molded matrix array package (MMAP) method is used for plastic package. A plastic package layer is formed on the upper surface of the substrate by injection-molding transfer molding. The material of the plastic package layer is any suitable plastic package material. For example, epoxy resin and amine or phenolic hardeners are used as the material, and the plastic package material may also contain fillers, such as ceramics or silica. Because the pressure of the transfer molding technology in the final transfer molding holding stage is greater than 6 MPa, the semiconductor package injection molding device in the embodiment of the present invention can be used for effectively reducing the stress on the substrate and effectively reducing the package cost.

In other embodiments, although the pressure on the substrate by other injection molding technologies is relatively small, the semiconductor package injection molding device in the embodiment of the present invention is also suitable for reducing the stress on the substrate.

The embodiment of the present invention further provides a semiconductor package injection molding mold, which, as shown in FIG. 2 or FIG. 3, includes:

a bottom mold 10 and a top mold 40, wherein the upper surface of the bottom mold 10 is fitted with the lower surface of a substrate 20; the top mold 40 is matched with the bottom mold 10; the top mold 40 has a cavity 41; the cavity 41 is oriented toward the upper surface of the substrate 20 and is used to accommodate a plastic package layer formed on the upper surface of the substrate 20; through holes 11 that penetrate through the bottom mold are formed at positions corresponding to the substrate in the bottom mold 10; and the through holes 11 are connected with an external pressure source.

In the present embodiment, the cavity of the top mold 40 defines the shape and the size of the plastic package layer. When the bottom mold 10 and the top mold 40 are clamped and fixed, a downward pressure is generated on the upper surface of the substrate during injection-molding transfer molding to form the plastic package layer.

Correspondingly, because the through holes 11 are arranged at the positions corresponding to the substrate 20 in the bottom mold 10, and the through holes 11 are connected with the external pressure source, the pressure generated by the pressure source on the lower surface of the substrate is used for balancing the pressure of the plastic package material on the upper surface of the substrate during the transfer molding. Thus, the substrate will not be subjected to warping stress or reduce the corresponding stress during injection-molding transfer molding. The substrate will not warp or greatly reduce the degree of warping, so as to avoid electrical contact damage and falling of the microelectronic chip, the substrate or some other electrical devices.

The embodiment of the present invention further provides a semiconductor package injection molding method for the semiconductor package injection molding device, including:

Step S10, superimposing, clamping and fixing the bottom mold, the substrate and the top mold, fitting the upper surface of the bottom mold with the lower surface of the substrate, orienting the cavity of the top mold towards the upper surface of the substrate and fitting the top mold with the upper surface of the substrate;

Step S20, when the upper surface of the substrate forms the plastic package layer by the transfer molding technology, applying pressure to the lower surface of the substrate by the pressure source through the through holes of the bottom mold, and balancing the pressure on the upper surface of the substrate during injection molding by the pressure generated by the pressure source on the lower surface of the substrate.

In the present embodiment, a molded matrix array package (MMAP) method is used to package the microelectronic chip. In other embodiments, a stacked-die chip-scale package (SCSP) method or other methods may also be used for packaging the microelectronic chip.

In the present embodiment, the semiconductor package injection molding device is used to form the plastic package layer by the injection-molding transfer molding technology. Because the pressure is generated on the upper surface of the substrate during transfer molding, the pressure source is used for applying air pressure to the lower surface of the substrate through the through holes of the bottom mold. The pressure generated by the pressure source on the lower surface of the substrate is controlled to balance the pressure on the upper surface of the substrate during transfer molding.

In one embodiment, when the pressure on the upper surface of the substrate during transfer molding exceeds a preset value, for example, 6 MPa, the pressure source is opened and the pressure source is used to apply pressure to the lower surface of the substrate through the through holes of the bottom mold, so that the pressure on the lower surface of the substrate balances the pressure on the upper surface of the substrate during transfer molding.

In another embodiment, during the transfer molding, the pressure generated on the upper surface of the substrate is detected in real time, and the corresponding pressure to be applied to the lower surface of the substrate is calculated in real time. The corresponding pressure is applied to the lower surface of the substrate by using the pressure source through the through holes of the bottom mold, so that the pressure difference between the upper and lower surfaces of the substrate in the whole transfer molding process is not large, thereby ensuring that the substrate will not warp in the whole transfer molding process.

In another embodiment, the same air pressure is applied to the lower surface of the substrate by each through hole.

In other embodiments, the pressures generated by different through holes can be selectively controlled so that the pressure of the pressure source on the lower surface of the substrate at different positions is changed, to more accurately offset the pressure on the upper surface of the substrate during transfer molding, thereby effectively alleviating the warping degree of the substrate.

In the later stage of transfer molding, when the pressure on the upper surface of the substrate is reduced, the pressure applied by the pressure source on the lower surface of the substrate is correspondingly reduced or cancelled to avoid the upward warping of the substrate.

In the present embodiment, the injection molding technology is a transfer molding injection-molding technology, and other injection molding technologies may also be applied in other embodiments.

The above only describes the preferred implementation modes of the present invention, and the protection scope of the present invention is not limited to the above embodiments. The technical solutions belonging to the idea of the present invention belong to the protection scope of the present invention. It should be noted that for those ordinary skilled in the art, several improvements and modifications can be made without departing from the principles of the present invention, and these improvements and modifications should also be considered to be within the protection scope of the present invention.

What is claimed is:

1. A semiconductor package injection molding device, comprising:
   a bottom mold;
   a top mold;
   a pressure source;
   pneumatic electric control valves; and
   a substrate,
   wherein an upper surface of the bottom mold is fitted with a lower surface of the substrate; the top mold is matched with the bottom mold;
   the top mold is provided with a cavity;
   the cavity is oriented towards an upper surface of the substrate and is used to accommodate a plastic package layer formed on the upper surface of the substrate;
   through holes that penetrate through the bottom mold are formed at positions corresponding to the substrate in the bottom mold;
   the through holes are connected with the pressure source through the pneumatic electric control valves respectively;
   the pressure source is configured to generate a positive pressure greater than an atmospheric pressure;
   the positive pressure on the lower surface of the substrate generated by the pressure source is used to balance a pressure on the upper surface of the substrate during injection molding;
   the lower surface of the substrate has bulges, and first through holes of the through holes are arranged at positions corresponding to the bulges;
   a size of each of the first through holes is greater than a size of each of the bulges;
   the pneumatic electric control valves are configured to control air pressures of the through holes such that air pressures corresponding to different through holes in the bottom mold are different, thereby forming different pressure distributions; and
   the air pressures of the first through holes at the positions corresponding to the bulges of the lower surface of the substrate are greater than the air pressures of second through holes of the through holes at other positions corresponding to the lower surface of the substrate.

2. The semiconductor package injection molding device according to claim 1, wherein the lower surface of the substrate further has grooves, and the second through holes are arranged at positions corresponding to the grooves.

3. The semiconductor package injection molding device according to claim 2, wherein each of the grooves corresponds to at least one of the second through holes.

4. The semiconductor package injection molding device according to claim 2, wherein pressure sensors are arranged in the first through holes and the second through holes respectively corresponding to the grooves and the bulges or on the lower surface of the substrate.

5. The semiconductor package injection molding device according to claim 1, wherein air pressures corresponding to the same through hole at different times are adjusted through the pneumatic electric control valves.

6. The semiconductor package injection molding device according to claim 1, wherein the pressure source is a pneumatic or hydraulic source.

7. The semiconductor package injection molding device according to claim 1, wherein an injection molding technology is a transfer molding injection-molding technology.

8. A semiconductor package injection molding method using the semiconductor package injection molding device of claim 1, comprising:

superimposing, clamping and fixing the bottom mold, the substrate and the top mold, fitting the upper surface of the bottom mold with the lower surface of the substrate, orienting the cavity of the top mold towards the upper surface of the substrate and fitting the top mold with the upper surface of the substrate;

when the upper surface of the substrate forms the plastic package layer by a transfer molding technology, applying the positive pressure to the lower surface of the substrate by the pressure source through the through holes of the bottom mold, and balancing the pressure on the upper surface of the substrate during the injection molding by the positive pressure generated by the pressure source on the lower surface of the substrate, wherein according to different substrates, the air pressures corresponding to the different through holes in the bottom mold are different, thereby forming the different pressure distributions.

9. The semiconductor package injection molding method according to claim 8, wherein when the pressure on the upper surface of the substrate exceeds a preset value during transfer molding, the pressure source is opened and the pressure source is used to apply the positive pressure to the lower surface of the substrate through the through holes of the bottom mold.

10. The semiconductor package injection molding method according to claim 8, wherein during transfer molding, the corresponding positive pressure to be applied to the lower surface of the substrate is calculated in real time by detecting the pressure generated on the upper surface of the substrate, and the pressure source is used to apply the corresponding positive pressure to the lower surface of the substrate through the through holes of the bottom mold.

11. The semiconductor package injection molding method according to claim 8, wherein an injection molding technology is a transfer molding injection-molding technology.

* * * * *